B. DE GANNER.
BROILER.
APPLICATION FILED JULY 17, 1917.
1,279,668.
Patented Sept. 24, 1918.
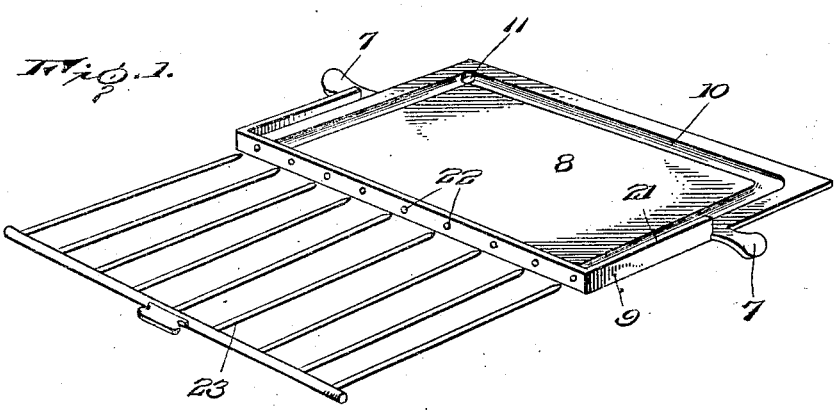
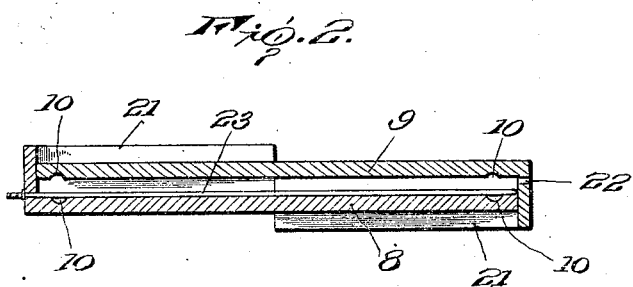
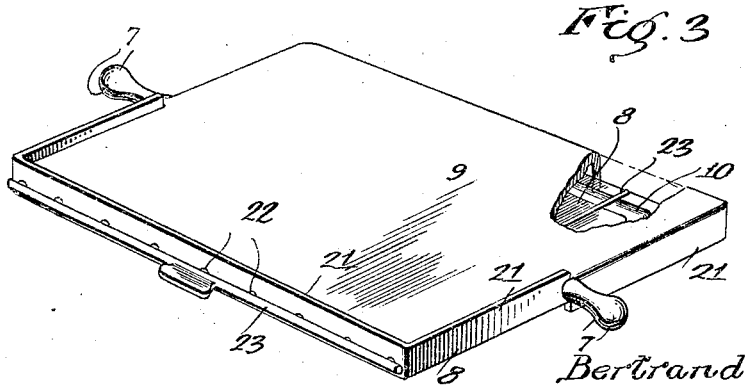
INVENTOR.
Bertrand De Ganner

UNITED STATES PATENT OFFICE.

BERTRAND DE GANNER, OF ST. LOUIS, MISSOURI.

BROILER.

1,279,668.

Specification of Letters Patent.

Patented Sept. 24, 1918.

Application filed July 17, 1917. Serial No. 181,147.

*To all whom it may concern:*

Be it known that I, BERTRAND DE GANNER, a citizen of the United States, residing in the city of St. Louis and State of Missouri, have invented certain new and useful Improvements in Broilers, of which the following is a specification.

This invention relates to broilers, the present application being directed particularly to a broiler plate originally shown, described and claimed in an application, Serial No. 88,344, filed by me April 1, 1916, which eventuated June 12, 1917, in Letters-Patent No. 1,229,591.

The invention is illustrated in the accompanying drawings, in which Figure 1 is a perspective view of the broiler plate;

Fig. 2 is a transverse section;

Fig. 3 is a perspective view showing the complete device assembled.

My improved broiler plate is provided at its ends with trunnions 7 which are adapted to engage grooves in the inner opposed faces of standards on the stove or range whereby the plate may be guided as it is moved toward or from the flame.

The broiler plate is composed of two members 8 and 9 which are of similar form and are provided in their inner faces adjacent their edges with grooves 10 by which the juices are directed to an opening 11 in one corner of the plate, the juices passing through said opening and being caught in a drip pan provided within the frame of the stove, as will be readily understood. Trunnions 7 are formed on each end of each member of the broiler plate and are of such shape that when the two plates with the trunnions are placed together the said trunnions will form projecting arms having spherical enlargements at their ends, the said spherical enlargements engaging in the said grooves in the standards so as to guide the broiler plate in its movement.

As previously stated, the broiler plate is composed of two similar members 8 and 9. These members are provided each along one edge and along a portion of each end with a flange 21 which is adapted to engage over the reduced edge of the mating member and thereby hold the two members in the desired relation, the trunnion on the upper member resting on the trunnion on the lower member. The flanges are provided with openings 22 therethrough and markers 23 may be inserted through the said openings so as to extend over the broiler plate and under the meat, providing additional surface to transmit heat to the meat and also marking the meat as usual.

The markers may be readily withdrawn when the meat is to be removed and the members of the broiler plate may be readily separated when they are to be cleaned or repaired.

By employing duplicate members 8 and 9, the broiler plate may be reversed so as to use the opposite sides alternately, thereby conserving the heat and economizing fuel. The markers may be easily removed to permit the plate to be used for frying or for cooking in other ways. When a steak has been broiled, it may be delivered onto a platter by merely rotating the broiler plate upon its trunnions while holding the platter in position to receive the meat. The juices will, therefore, be retained in the meat as it is not necessary to pierce the same with a fork and lift it from the broiler plate.

Having thus described the invention, what is claimed as new is:

1. A broiler consisting of duplicate members each provided with a continuous flange extending along one side edge and a part only of each end edge, and an axial projection at each terminal of said flange, said flange being adapted to extend across the unflanged portion of the edges of the mating member and the projections on each member being adapted to bear against the projections on the other member and thereby form supporting trunnions, the members being provided with grooves in their inner opposed faces adjacent and parallel with their edges.

2. A broiler consisting of mating members each provided with a flange extending along its side edge and a part only of each end edge and adapted to engage across the unflanged portion of the edge of the mating member, that portion of the flange extending along the side edge of the member having perforations therethrough, and markers inserted through said perforations in the flange of one member from the outer face of said flange to project over and rest upon the inner surface of said member.

3. A broiler consisting of duplicate mating members each comprising a substantially flat plate having a flange projecting from one face along one side edge and flanges projecting from the said face and extending from the ends of the first-mentioned flange along one-half the respective end edges of the plate, the flanges on each plate being arranged to engage across the unflanged portions of the edges of the mating member with the terminals of the opposed flanges abutting, and mating trunnion-forming projections at the terminals of the flanges.

In testimony whereof I affix my signature.

BERTRAND DE GANNER. [L. S.]

Copies of this patent may be obtained for five cents each, by addressing the "Commissioner of Patents, Washington, D. C."